US008558496B2

(12) United States Patent
Welchko et al.

(10) Patent No.: US 8,558,496 B2
(45) Date of Patent: Oct. 15, 2013

(54) SYSTEMS AND METHODS FOR MONITORING CURRENT IN AN ELECTRIC MOTOR

(75) Inventors: Brian A. Welchko, Torrance, CA (US); Silva Hiti, Redondo Beach, CA (US); Ronald W. Young, Whittier, CA (US); David Tang, Fontana, CA (US); Gregory S. Smith, Woodland Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 13/049,653

(22) Filed: Mar. 16, 2011

(65) Prior Publication Data

US 2012/0235622 A1    Sep. 20, 2012

(51) Int. Cl.
*G05B 5/00* (2006.01)
(52) U.S. Cl.
USPC ............................. 318/445; 318/438; 318/801
(58) Field of Classification Search
USPC ......... 318/445, 438, 801, 803, 434, 700, 139, 318/611, 400.22, 490, 288, 491
See application file for complete search history.

(56) References Cited

U.S. PATENT DOCUMENTS

| | | | |
|---|---|---|---|
| 7,161,323 | B2 | 1/2007 | Ajima et al. |
| 7,193,383 | B2 | 3/2007 | Sarlioglu et al. |
| 7,271,557 | B2 | 9/2007 | Ajima et al. |
| 7,646,160 | B2 * | 1/2010 | Chen et al. ................... 318/490 |
| 7,973,499 | B2 | 7/2011 | Yoshioka |
| 8,159,163 | B2 | 4/2012 | Akiyama |

OTHER PUBLICATIONS

USPTO, U.S. Office Action mailed Apr. 18, 2012 for U.S. Appl. No. 12/723,136.
Welchko, B.A., "Systems and Methods for Monitoring Current in an Electric Motor," U.S. Appl. No. 12/723,136, filed Mar. 12, 2010.
Chinese Patent & Trademark Office, Chinese Office Action dated Mar. 5, 2013 for Patent Application for Invention No. 201110058696.X.

* cited by examiner

*Primary Examiner* — Karen Masih
(74) *Attorney, Agent, or Firm* — Ingrassia Fisher & Lorenz, P.C.

(57) ABSTRACT

Systems and methods are provided for monitoring current in an electric motor. An electrical system includes a (DC) interface, an electric motor, an inverter module coupled between the DC interface and the electric motor, a first current sensor between a first phase leg of the inverter module and a first phase of the electric motor to measure a first current flowing through the first phase of the electric motor, a second current sensor between the first phase leg and the DC interface to measure a second current flowing through the first phase leg, and a control module coupled to the first current sensor and the second current sensor. The control module is configured to initiate remedial action based at least in part on a difference between the first current measured by the first current sensor and the second current measured by the second current sensor.

20 Claims, 3 Drawing Sheets

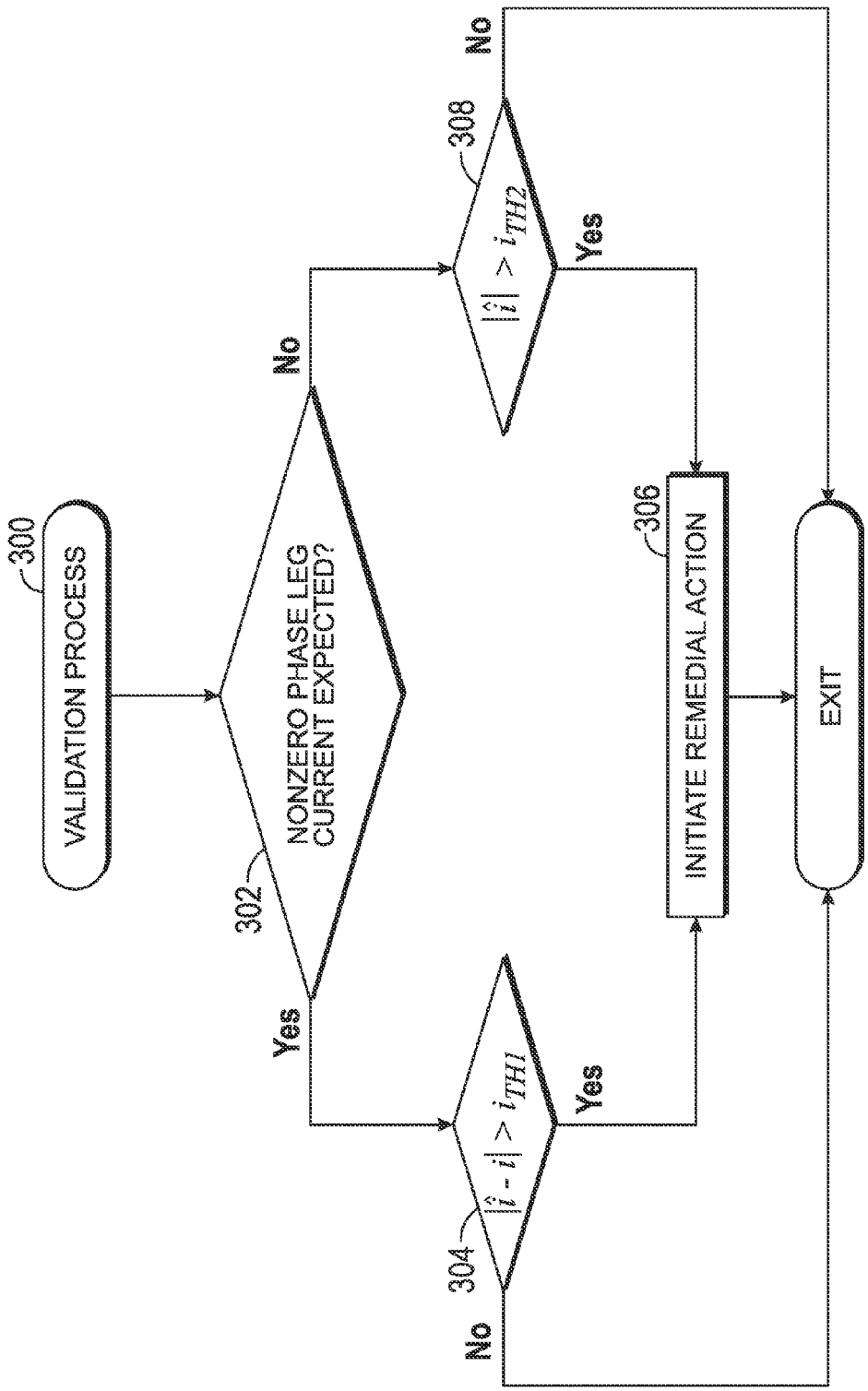

SYSTEMS AND METHODS FOR MONITORING CURRENT IN AN ELECTRIC MOTOR

TECHNICAL FIELD

Embodiments of the subject matter described herein relate generally to electric motor drive systems, and more particularly, embodiments of the subject matter relate to methods and systems for monitoring current in electric motors.

BACKGROUND

In vehicles using electric traction motors, alternating current (AC) motor drives are used to provide a requested torque to the motor shaft. In practice, the amount of torque produced by an electric motor is directly related (although not perfectly proportional) to the amount of current provided to the motor. Therefore, by regulating and precisely controlling the current to the electric motor, the amount of torque produced by the electric motor may be accurately controlled and monitored.

In many systems, the input motor current is not directly controlled. For example, many electric motors are operated using pulse-width modulation (PWM) techniques in combination with an inverter (or another switched-mode power supply) to control the voltage across the motor windings, which in turn, produces current in the motor. In response to a requested torque (or commanded torque), most prior art systems determine a desired input motor current for producing the requested amount of torque and utilize a closed loop control system to control the current through the motor windings and thereby regulate the amount of torque produced by the motor. Current sensors are used to measure the motor current, which is then compared to the desired input motor current. The PWM commands for the inverter are adjusted to increase and/or decrease the voltage across the motor windings, such that the measured motor current tracks the desired input motor current.

When a current sensor does not accurately measure the motor current, the ability of these closed-loop control systems to control the motor torque is impaired. For example, without accurate motor current information, the control system may cause the motor to produce insufficient torque, excessive torque, or varying or oscillating amounts of torque. Accordingly, it is desirable to monitor the current sensors and provide protection in the event a current sensor is not accurately measuring the motor current to ensure reliable operation of the electric motor.

BRIEF SUMMARY

In accordance with one embodiment, an electrical system for use in a vehicle is provided. The electrical system includes a direct current (DC) interface, an electric motor having a plurality of phases, an inverter module coupled between the DC interface and the electric motor, a first current sensor between a first phase leg of the inverter module and a first phase of the electric motor to measure a first current flowing through the first phase of the electric motor, a second current sensor between the first phase leg and the DC interface to measure a second current flowing through the first phase leg, and a control module coupled to the first current sensor and the second current sensor. The control module is configured to initiate remedial action based at least in part on a difference between the first current measured by the first current sensor and the second current measured by the second current sensor.

In accordance with another embodiment, a method is provided for operating an electrical system that includes an inverter coupled to an electric motor. The method involves obtaining a first phase current flowing through a first phase of the electric motor, measuring a first current flowing through a first phase leg of the inverter using a first current sensor, the first phase leg being coupled to the first phase of the electric motor, and determining an expected value for the first current. When the expected value corresponds to the first phase current, the method continues by initiating remedial action based on a difference between the first phase current and the measured first current.

In another embodiment, an electrical system is provided. The electrical system includes an electric motor having a plurality of phases, an inverter module coupled to the electric motor, the inverter module comprising a plurality of phase legs wherein each phase leg corresponds to a phase of the electric motor, a first current sensor configured to measure a first current flowing through a first phase leg of the plurality of phase legs of the inverter module, the first phase leg being coupled to a first phase of the electric motor, and a control module coupled to the first current sensor and the inverter module. The control module is configured to obtain a first phase current flowing through the first phase of the electric motor, and initiate remedial action when a difference between the first current and the first phase current is indicative of an error condition.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a flow diagram of a validation process suitable for use with the control process of FIG. 2 in accordance with one embodiment.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the subject matter described herein relate generally to systems and/or methods for monitoring current sensors used to control an inverter and/or electric motor in an electrical system in a vehicle. As described in greater detail below, current sensors are used to measure a current flowing through portions of the inverter phase legs, and the measured values obtained by the phase leg current sensors are used to validate the measured values for the phase currents of the electric motor obtained by phase current sensors. In this regard, when a measured phase leg current and a measured motor phase current are expected to be the same (or equal to one another), a difference between the measured phase leg current and the measured motor phase current that is greater than a threshold value is indicative of an error condition within the electrical system. For example, an error condition may be a current sensor that is not accurately measuring current or a fault condition. In response to identifying an error condition, one or more remedial actions are taken to ensure safe and reliable operation of the electric motor. Additionally, when a measured phase leg current is expected to be equal to zero, the magnitude of the measured phase leg current may be analyzed to identify the presence of a fault condition.

Figure 1:
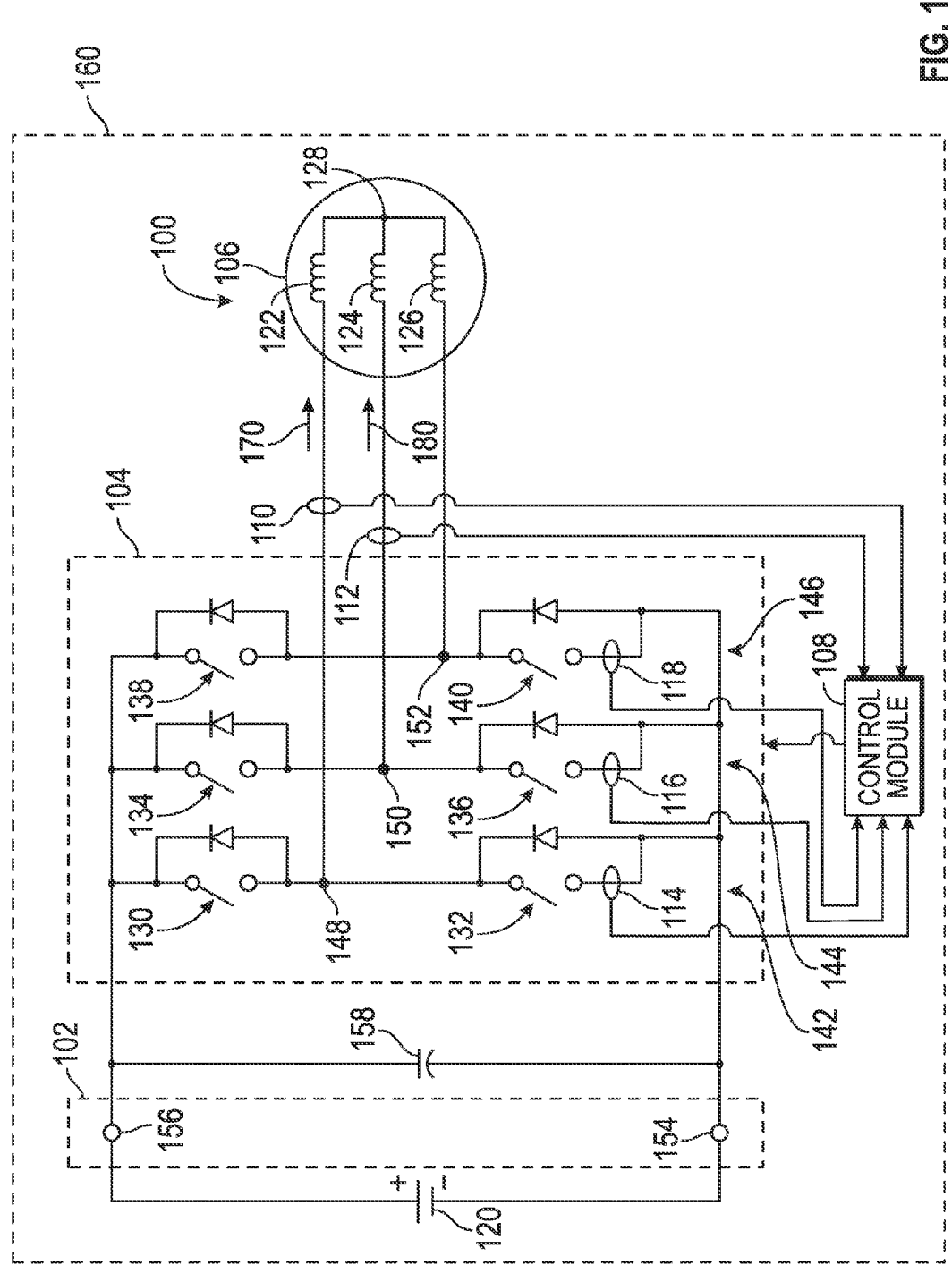
FIG. 1 is a schematic view of an electrical system suitable for use in a vehicle in accordance with one embodiment.

FIG. 1 depicts an exemplary embodiment of an electrical system 100 suitable for use in a vehicle 160, such as, for example, an electric and/or hybrid vehicle. The electrical system 100 includes, without limitation, a direct current (DC) interface 102, a power inverter module 104, an electric motor 106, a control module 108, a pair of current sensors 110, 112 configured to measure current through respective phases of the electric motor 106, and a plurality of current sensors 114, 116, 118 configured to measure current through respective phase legs of the power inverter module 104, as described in greater detail below. It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

The DC interface 102 generally represents the physical interface (e.g., terminals, connectors, and the like) for coupling the electrical system 100 to a DC energy source 120. In an exemplary embodiment, the control module 108 operates the inverter module 104 based at least in part on the measured values for the phase currents of the electric motor 106 obtained by the motor phase current sensors 110, 112 to achieve a desired power flow between the DC energy source 120 and the electric motor 106, as described in greater detail below.

In an exemplary embodiment, the DC energy source 120 (or alternatively, the energy storage source or ESS) is capable of providing and/or receiving a direct current to/from the electrical system 100 at a particular DC voltage level. Depending on the embodiment, the energy source 120 may be realized as a battery, a fuel cell (or fuel cell stack), an ultracapacitor, a controlled generator output, or another suitable voltage source. The battery may be any type of battery suitable for use in a desired application, such as a lead acid battery, a lithium-ion battery, a nickel-metal battery, a rechargeable high-voltage battery pack, or another suitable energy storage element. In an exemplary embodiment, the DC energy source 120 has a nominal DC voltage range from about 200 to about 500 Volts DC. As shown, the electrical system 100 may include a capacitor 158 (alternatively referred to as a DC link capacitor or bulk capacitor) coupled between node 154 and another node 156 of the DC interface 102 and the inverter module 104 and configured electrically parallel to the DC energy source 120 to reduce voltage ripple at the DC interface 102 and/or DC energy source 120, as will be appreciated in the art.

The vehicle 160 is preferably realized as an automobile, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 160 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, in addition to the electric motor 106.

In an exemplary embodiment, a first motor phase current sensor 110 is interposed or otherwise arranged between the inverter module 104 and the electric motor 106 and configured to measure a phase current for a first phase of the electric motor 106 (e.g., phase A), and a second motor phase current sensor 112 is interposed or otherwise arranged between the inverter module 104 and the electric motor 106 and configured to measure a phase current for a second phase of the electric motor 106 (e.g., phase B). In an exemplary embodiment, each of the phase current sensors 110, 112 is realized as a Hall effect current sensor configured to measure the respective phase current to within at least about 2% to about 5% of the full scale current range for the current sensor.

In an exemplary embodiment, the electric motor 106 is realized as a multi-phase alternating current (AC) motor and includes a set of windings (or coils), wherein each winding corresponds to a phase of the motor 106. In the illustrated embodiment of FIG. 1, the motor 106 is realized as a three-phase AC motor having a three-phase set of windings including a first (e.g., phase A) winding 122, a second (e.g., phase B) winding 124, and a third (e.g., phase C) winding 126. In this regard, phase current sensor 110 is configured to measure the current flowing through the first winding 122 (e.g., the phase A motor current) and phase current sensor 112 is configured to measure the current flowing through the second winding 124 (e.g., the phase B motor current). It should be understood that the labeling of phases A, B, and C is for ease of description and is not intended to limit the subject matter in any way.

In an exemplary embodiment, the windings 122, 124, 126 are configured in a wye-connection, wherein an end of each winding is connected to ends of the other windings at a common node. For example, as shown in FIG. 1, the windings 122, 124, 126 are connected and/or terminate at a common node 128. The motor 106 may be an induction motor, a permanent magnet motor, or any type suitable for the desired application. Although not illustrated, the motor 106 may also include a transmission integrated therein such that the motor 106 and the transmission are mechanically coupled to at least some of the wheels of the vehicle 160 through one or more drive shafts. Additionally, the motor 106 may include a stator assembly (including the coils), a rotor assembly (including a ferromagnetic core), and a cooling fluid (i.e., coolant), as will be appreciated by one skilled in the art. It should be understood that although the electrical system 100 is described herein in the context of a three-phase motor, the subject matter described herein is not intended to be limited to three-phase motors.

In the illustrated embodiment, the power inverter module 104 includes six switching elements 130, 134, 138, 132, 136, 140 (e.g., semiconductor devices, such as transistors and/or switches) with antiparallel diodes (i.e., diodes which are antiparallel to each switch). In this regard, each switch and diode are configured electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 120 for charging the DC energy source 120 when the respective switch is off. Preferably, the switches are realized using insulated-gate bipolar transistors (IGBTs); however, in alternative embodiments, the switches may be realized as field-effect transistors (e.g., a MOSFET) or another switching device known in the art.

As shown, the switches in the inverter module 104 are arranged into three phase legs (or pairs) 142, 144, 146, with each phase leg 142, 144, 146 being coupled to a respective end of the windings 122, 124, 126. In this regard, a node 148 between the switches 130, 132 of the first phase leg 142 is coupled to the phase A winding 122, and a node 150 between the switches 134, 136 of the second phase leg 144 is coupled to the phase B winding 124, and a node 152 between the switches 138, 140 of the third phase leg 146 is coupled to the phase C winding 126. Thus, phase leg 142 may be referred to as the phase A leg, phase leg 144 the phase B leg, and phase leg 146 the phase C leg.

As set forth above, the phase current sensors 110, 112 are each arranged between a phase leg 142, 144 of the inverter module 104 and its corresponding winding 122, 124 such that each phase current sensor 110, 112 measures, senses, or otherwise obtains values for a phase current flowing from/to the inverter module 104 to/from the electric motor 106. For example, as shown, the first phase current sensor 110 is arranged or otherwise interposed between node 148 of phase leg 142 and winding 122 and measures the phase A motor current ($i_A$), and the second phase current sensor 112 is arranged or otherwise interposed between node 150 of phase leg 144 and winding 124 and measures the phase B motor current ($i_B$). It should be noted that although FIG. 1 depicts the phase current sensors 110, 112 arranged to measure the phase A and B motor currents for purpose of explanation, in alternative embodiments, the phase current sensors 110, 112 may be arranged to measure the phase A and C motor currents or the phase B and C motor currents.

As illustrated in FIG. 1, a first phase leg current sensor 114 is interposed or otherwise arranged between node 148 of the phase A leg 142 of the inverter module 104 and a node 154 of the DC interface 102 and configured to measure the current flowing in the phase A leg 142 from node 148 to node 154 through the switch 132. In this regard, when the switch 132 is closed or otherwise turned on and the phase A motor current flows through the phase A winding 124 in a negative direction (in the direction opposite arrow 170) from node 128 to node 148, the phase leg current measured by the phase leg current sensor 114 should be substantially equal to the phase A motor current measured by the phase A current sensor 110, as described in greater detail below. Alternatively, when the switch 132 is opened or the phase A motor current flows through the phase A winding 124 in a positive direction (indicated by arrow 170) from node 148 to node 128, the phase leg current measured by the phase leg current sensor 114 should be substantially equal to zero as the current flows from node 154 to node 148 through the diode antiparallel to switch 132.

In an exemplary embodiment, the current sensor 114 is realized as a pilot current sensor that is integrated with the switch 132. For example, the switch 132 may be realized as a transistor formed on a semiconductor substrate or die, wherein the current sensor 114 is integrated on the same semiconductor substrate or die and senses or otherwise measured the current flowing through the switch 132 to produce an electrical signal indicative of or otherwise influenced by the magnitude current flowing through the switch 132. In an exemplary embodiment, the phase leg current sensor 114 measures the current flowing through switch 132 to within about 10% of its full scale current range. In a similar manner, in an exemplary embodiment, the other phase leg current sensors 116, 118 are also realized as pilot current sensors integrated with the respective switch 136, 140 of their respective phase leg 144, 146. In this regard, the second phase leg current sensor 116 is interposed or otherwise arranged between node 150 of the phase B leg 144 and node 154 of the DC interface 102 and configured to measure the current flowing in the phase B leg 144 from node 150 to node 154 through the switch 136, and the third phase leg current sensor 118 is interposed or otherwise arranged between node 152 of the phase C leg 146 and node 154 of the DC interface 102 and configured to measure the current flowing in the phase C leg 146 from node 152 to node 154 through the switch 140.

The control module 108 generally represents the hardware, firmware and/or software configured to operate and/or modulate the switches 130, 134, 138, 132, 136, 140 of the inverter module 104 to achieve a desired power flow between the DC energy source 120 and the electric motor 106. In an exemplary embodiment, the control module 108 is in operable communication and/or electrically coupled to the inverter module 104 and the current sensors 110, 112. The control module 108 is responsive to commands received from the driver of the vehicle 160 (e.g., via an accelerator pedal) and provides a command to the inverter module 104 to control the output of the inverter phase legs 142, 144, 146. In an exemplary embodiment, the control module 108 is configured to modulate and control the inverter module 104 using high frequency pulse width modulation (PWM), as described below. The control module 108 provides PWM command signals to operate (e.g., open and/or close) the switches 130, 134, 138, 132, 136, 140 of the inverter phase legs 142, 144, 146 to cause output voltages to be applied across the windings 122, 124, 126 within the motor 106, which, in turn, produces current(s) through the windings 122, 124, 126 of the motor 106 to operate the motor 106 with the commanded torque. In an exemplary embodiment, the control module 108 implements closed-loop current-based (or current-regulated) control of the motor 106, wherein the PWM signals are determined or otherwise adjusted based on differences between the motor phase currents measured by phase current sensors 110, 112 and desired (or commanded) motor phase currents.

Depending on the embodiment, the control module 108 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. Although not illustrated, the control module 108 may generate current and/or voltage commands for the phases of the motor 106 in response to receiving a torque command from an electronic control unit (ECU), system controller, or another control module within the vehicle 160. Further, in some embodiments, the control module 108 may be integral with an ECU or another vehicle control module.

As described in greater detail below, in an exemplary embodiment, the control module 108 is coupled to the inverter phase leg current sensors 114, 116, 118 and validates, verifies, or otherwise monitors the measured values obtained by the current sensors 110, 112 to ensure the current sensors 110, 112 are functioning properly based on the relationship between the motor phase currents measured by phase current sensors 110, 112 and the phase leg currents measured by the phase leg current sensors 114, 116, 118. In this regard, as described in greater detail below, the control module 108 determines expected values for the phase leg currents based on the state of the inverter phase legs 142, 144, 146 at the time the measured phase leg currents are obtained. When the control module 108 determines that a respective phase leg current is expected to be equal to its corresponding motor phase current based on the state of the respective switch 132, 136, 140 of the respective phase leg 142, 144, 146 and the direction of its corresponding motor phase current, the control module 108 compares the measured motor phase current and its corresponding measured phase leg current to ensure they are substantially equal. When a difference between the measured motor phase current and the measured phase leg current exceeds a first threshold value (e.g., a predetermined tolerance), the control module 108 determines an error condition exists within the electrical system 100 and initiates a remedial action, as described in greater detail below. Alternatively, when the control module 108 determines that a respective phase leg current is expected to be equal to zero based on the state of the respective switch 132, 136, 140 and the direction of its corresponding motor phase current, the control module 108 analyzes the magnitude of the measured phase leg current and determines an error condition exists within the electrical system 100 and initiates a remedial action when the magnitude of the measured phase leg current exceeds a second threshold value, as described in greater detail below. In accordance with one or more embodiments, the first threshold value and the second threshold value are equal to one another.

It should be noted that although the subject matter is described herein in the context of phase leg current sensors 114, 116, 118 configured to measure phase leg currents through switches 132, 136, 140, in practice, in addition to or in lieu of phase leg current sensors 114, 116, 118, the electrical system 100 may be modified to include phase leg current sensors to measure the phase leg currents flowing between nodes 148, 150, 152 of the inverter phase legs 142, 144, 146 and a node 156 of the DC interface 102. For example, although not illustrated by FIG. 1, in some embodiments, pilot current sensors may be integrated with switches 130, 134, 138. In this regard, a first phase leg current sensor configured to measure the current flowing in the phase A leg 142 from node 156 to node 148 through the switch 130, wherein when the switch 130 is closed or otherwise turned on and the phase A motor current flows through the phase A winding 124 in a positive direction (indicated by arrow 170), the measured phase leg current should be substantially equal to the phase A motor current measured by the phase A current sensor 110. Alternatively, when the switch 130 is opened or the phase A motor current flows through the phase A winding 124 in a negative direction (opposite the direction indicated by arrow 170), the measured phase leg current should be substantially equal to zero. Accordingly, it will be appreciated that the subject matter described herein is not intended to be limited to any particular number or configuration of phase leg current sensors.

Figure 2:
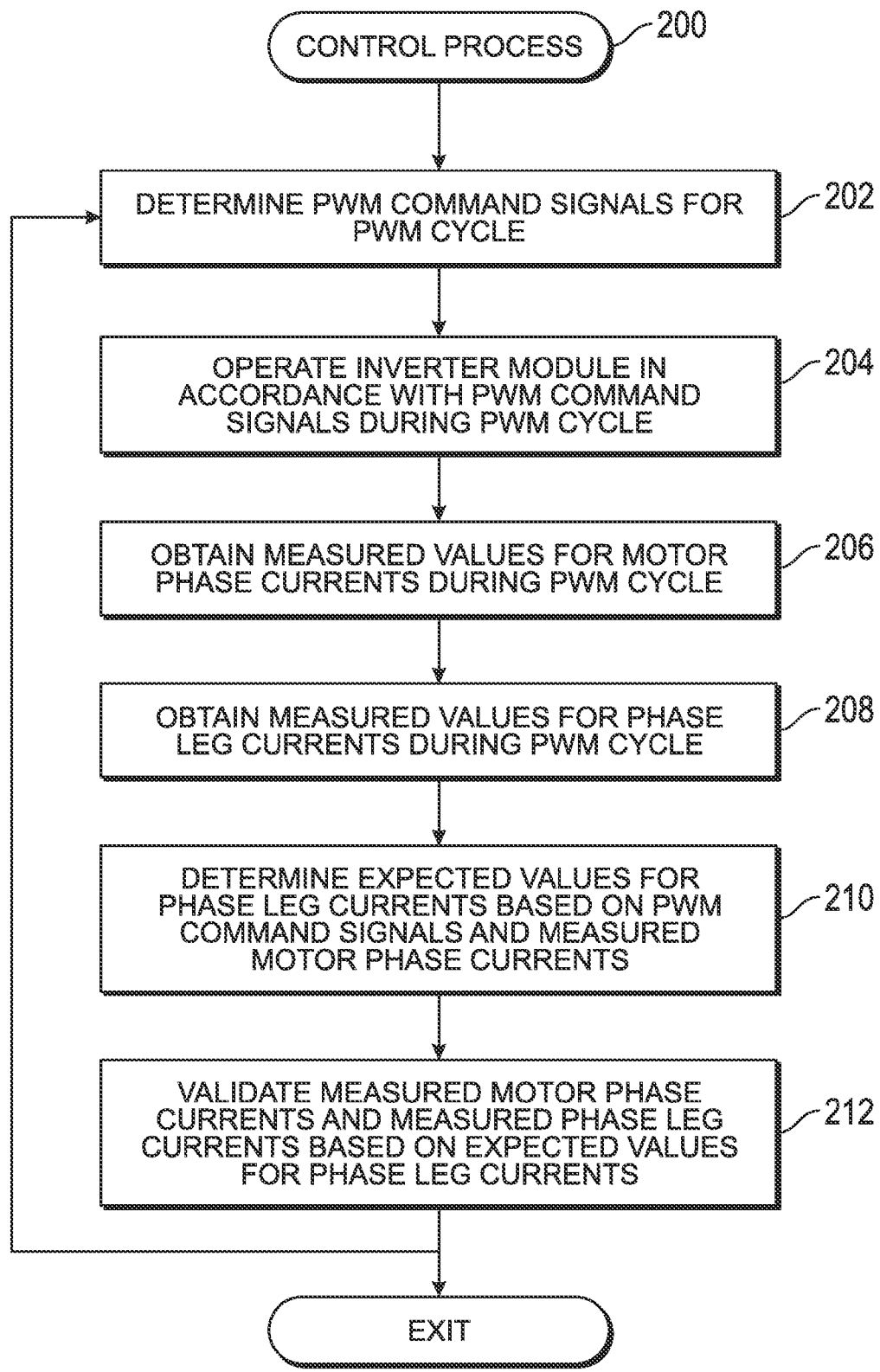
FIG. 2 is a flow diagram of a control process suitable for use with the electrical system of FIG. 1 in accordance with one embodiment.

Referring now to FIG. 2, in an exemplary embodiment, an electrical system may be configured to perform a control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the inverter module 104, the current sensors 110, 112, 114, 116, 118, and/or the control module 108. It should be appreciated that any number of additional or alternative tasks may be included, and may be incorporated into a more comprehensive procedure or process having additional functionality not described in detail herein.

Referring to FIG. 2, and with continued reference to FIG. 1, the control process 200 may be performed to enable closed-loop current-controlled operation of an electric motor using an inverter module while also verifying that the current sensors used for the closed-loop current control are measuring current accurately and/or providing protection from a fault condition that may exist within the electrical system. The control process 200 initializes or begins by determining PWM command signals for the inverter module for a PWM cycle (or switching interval) and operating the inverter module in accordance with the PWM command signals during the PWM cycle (tasks 202, 204). For example, the control module 108 may obtain a torque command (e.g., from an ECU, system controller, or another control module within the vehicle 160) and determine current commands for the electric motor 106 based on the torque command Based on a difference between the current commands and measured motor phase currents obtained from the motor phase current sensors 110, 112, the control module 108 generates PWM command signals for the phase legs 142, 144, 146 of the inverter module 104 to produce the commanded current, and thus, the commanded torque, in the electric motor 106. In an exemplary embodiment, the control module 108 determines voltage commands for producing the commanded current and determines PWM command signals for the phase legs 142, 144, 146 of the inverter module 104 based on the voltage commands. The control module 108 modulates (e.g., opens and/or closes) the switches of the phase legs 142, 144, 146 during the PWM cycle based on the PWM command signals, which results in one or more voltage vectors being applied by the inverter module 104 to the electric motor 106 during the PWM cycle such that the effective AC voltages across the corresponding phases of the windings 122, 124, 126 are substantially equal (within practical and/or realistic operating tolerances) to the voltage commands, as will be appreciated in the art.

In an exemplary embodiment, the control process 200 continues by obtaining measured values the motor phase currents during the PWM cycle (task 206). In an exemplary embodiment, the control module 108 obtains measured values for the motor phase currents from the phase current sensors 110, 112 at a particular time during the PWM cycle. For example, the measured values of the motor phase currents may be obtained and/or measured simultaneously at an instant of the PWM cycle which would yield the average current of the PWM cycle to facilitate higher quality current control. For example, in practice, the control module 108 may simultaneously and/or concurrently read (or sample) the phase current sensors 110, 112 at the beginning of the PWM cycle. In alternative embodiments, the control module 108 may obtain measured values for the motor phase currents from the phase current sensors 110, 112 at the middle of the PWM cycle, the end of the PWM cycle, at some other instant during the PWM cycle, or at different times (i.e., not simultaneously) during the PWM cycle. In other embodiments, the control module 108 may obtain measured values for the motor phase currents by reading (or sampling) the phase current sensors 110, 112 at the same time as (or in sync with) reading (or sampling) the phase leg current sensors 114, 116, 118 each time a different voltage vector is applied to the motor 106 (e.g., each time one or more of the switches 130, 132, 134, 136, 138, 140 changes state), as described in greater detail below. In an exemplary embodiment, the control module 108 calculates a measured value for a motor phase current through the phase C windings 126 using the measured values for the other two motor phase currents obtained from the phase current sensors 110, 112 based on Kirchoff's current law. In this regard, for a wye-connected electric motor, the motor phase currents sum to zero (e.g., $i_A + i_B + i_C = 0$), wherein the control module 108 calculates a measured phase C motor current ($i_C$) based on the measured values for phase A and phase B motor currents from the phase current sensors 110, 112 (e.g., $i_C = -i_A - i_B$).

In an exemplary embodiment, the control process 200 continues by obtaining measured values the phase leg currents during the PWM cycle (task 208). In an exemplary embodiment, the control module 108 obtains a measured value for the phase leg currents from the phase leg current sensors 114, 116, 118 each time a different voltage vector is applied to the electric motor 106. In this regard, the control module 108 may asynchronously read (or sample) a measured value of the phase leg currents from the phase leg current sensors 114, 116, 118 each time the control module 108 operates the inverter module 104 to change the voltage vector being applied to the electric motor 106. In other words, the control module 108 obtains a measured value of the phase leg currents from the phase leg current sensors 114, 116, 118 each time the state of one or more switches of the phase legs 142, 144, 146 are changed during the PWM cycle. For example, in a PWM cycle, the inverter module 104 may implement and/or apply two active vectors (or non-zero vectors) and a zero vector, resulting in three measured values for the phase leg currents obtained during that PWM cycle. In an exemplary embodiment, the control module 108 stores the measured values of the phase leg currents for the PWM cycle and maintains an association between each measured value of the phase leg currents and the state of the switches of the phase legs 142, 144, 146 at the time the phase leg current sensors 114, 116, 118 were read and/or sampled to obtain the respective measured value (e.g., the voltage vector at the time the respective measured value was obtained). In accordance with one or more embodiments, when multiple measured values for a phase leg current are obtained during the PWM interval, the control module 108 may average the measured values that are expected to be the same, as described in greater detail below.

In an exemplary embodiment, the control process 200 continues by determining expected values for the measured phase leg currents based on the measured motor phase currents and the PWM command signals during the PWM cycle (task 210). In this regard, the control module 108 determines expected values for the phase leg currents based on the voltage vectors being applied at the time the phase leg current sensors 114, 116, 118 were read and/or sampled (e.g., the state of the switches 132, 136, 140) and the direction of the motor phase currents during the PWM cycle. For example, when a measured value for the phase A current is positive (i.e., in the direction indicated by arrow 170) during the PWM interval, the control module 108 determines an expected value of zero for each measured phase A leg current obtained during the PWM interval. When the measured value for the phase A current is negative (i.e., in the direction opposite arrow 170), the control module 108 determines that the expected phase A leg current value is equal to or otherwise corresponds to the phase A motor current (i.e., the current through the phase A windings 122) for each measured value for the phase A leg current is obtained from phase A leg current sensor 114 when the switch 132 is closed, and otherwise, determines that an expected value of zero for each measured value for the phase A leg current is obtained from phase leg current sensor 114 when the switch 132 is opened. In accordance with one or more embodiments, the control module 108 may average the measured phase A leg current values obtained during the PWM interval that are expected to be equal to zero to obtain a single value for the measured phase A leg current that is expected to be equal to zero, and separately average the measured phase A leg current values obtained during the PWM interval that are expected to be equal to the phase A motor current to obtain a single value for the measured phase A leg current that is expected to be equal to the phase A motor current.

In a similar manner, the control module 108 determines an expected value for each phase B leg current value obtained from the phase B leg current sensor 116 when the measured phase B motor current obtained from the phase B current sensor 112 during the PWM cycle is positive (i.e., in the direction indicated by arrow 180) or when the switch 136 is opened when the measured phase B current value was obtained. The control module 108 determines an expected value corresponding to the phase B motor current for each phase B leg current value obtained from the phase leg current sensor 116 when the switch 136 is closed and the measured phase B motor current is negative (i.e., in the direction opposite arrow 180). Likewise, the control module 108 determines an expected value for each phase C leg current value obtained from the phase C leg current sensor 118 when the measured phase C motor current calculated based on the measured phase currents obtained from the motor phase current sensors 110, 112 is positive or when the switch 140 is opened when the measured phase C current value was obtained. The control module 108 determines an expected value corresponding to the phase C motor current for each phase C leg current value obtained from the phase C leg current sensor 118 when the switch 140 is closed and the calculated measured phase C motor current is negative.

In an exemplary embodiment, the control process 200 continues by validating or otherwise verifying the measured value(s) obtained for the motors phase currents and the phase leg currents based on the expected values for the phase leg currents (task 212). In an exemplary embodiment, for each measured phase leg current, the control module 108 performs a validation process 300 as described in greater detail below in the context of FIG. 3. After the measured value(s) obtained for the motors phase currents and the phase leg currents are validated, the loop defined by tasks 202, 204, 206, 208, 210 and 212 may repeat as desired throughout operation of the electrical system to validate the motor phase currents and phase leg currents during subsequent PWM cycles and ensure proper functionality of the current sensors 110, 112, 114, 116, 118. As described in greater detail below, when a measured phase leg current deviates from its expected value by more than a threshold amount indicative of an error condition, the control module 108 fails to validate or verify that measured phase leg current and initiates one or more remedial actions and/or other measures to ensure safe and effective operation of the electric motor 106, as described in greater detail below.

As described in greater detail below, in an exemplary embodiment, when a respective phase leg current is expected to be equal to its corresponding motor phase current, the control module 108 compares the measured phase leg current to its corresponding measured motor phase current to determine or otherwise detect when a difference between the measured phase leg current and the measured motor phase current exceeds a threshold value indicative of an error condition. For example, when the measured phase A leg current is expected to be equal to the phase A motor current, the control module 108 compares the measured value(s) for the current through the phase A leg 142 obtained from the phase A leg current sensor 114 to the measured phase A motor current obtained from the phase A current sensor 110 and determines whether a difference between the measured phase A leg current and the measured phase A motor current exceeds the threshold value. In a similar manner, when the measured phase B leg current is expected to be equal to the phase B motor current, the control module 108 determines whether a difference between the measured phase B leg current value(s) obtained from the phase B leg current sensor 116 and the measured phase B motor current value obtained from the phase B current sensor 112 exceeds the threshold value. Likewise, when the measured phase C leg current is expected to be equal to the phase C motor current, the control module 108 determines whether a difference between the measured phase C leg current values(s) obtained from the phase C leg current sensor 118 and the measured phase C motor current calculated based on the measured motor phase currents exceeds the threshold value. In response to determining a difference between a measured phase leg current and its corresponding measured motor phase current exceeds the threshold value when the measured phase leg current is expected to be equal to the motor phase current, the control module 108 initiates one or more remedial actions, as described in greater detail below.

When a respective phase leg current is expected to be equal to zero, the control module 108 determines whether the magnitude of the measured phase leg current exceeds a second threshold value indicative of an error condition. For example, when the measured phase A leg current is expected to be equal to zero, the control module 108 determines whether the measured value(s) for the current through the phase A leg 142 exceeds a second threshold value. In a similar manner as set forth above, in response to determining a magnitude of a measured phase leg current exceeds the second threshold value when the measured phase leg current is expected to be equal to zero, the control module 108 initiates one or more remedial actions and/or other measures to ensure safe and effective operation of the electric motor 106.

Referring now to FIG. 3, in an exemplary embodiment, an electrical system may be configured to perform a validation process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the inverter module 104, the current sensors 110, 112, 114, 116, 118, and/or the control module 108. It should be appreciated that any number of additional or alternative tasks may be included, and may be incorporated into a more comprehensive procedure or process having additional functionality not described in detail herein.

Referring to FIG. 3, and with continued reference to FIG. 1, in an exemplary embodiment, the validation process 300 is performed for each measured phase leg current value to detect or otherwise identify an error condition (e.g., a fault condition or an error in one of the current sensors) when a difference between a measured value and an expected value for the particular phase leg current exceeds a threshold value. In this regard, the threshold value is chosen such that a difference between the measured value and the expected value exceeding the threshold value is indicative of an error condition within the electrical system 100 (e.g., a current sensor error or a fault condition in the electrical system 100), while a difference between a measured value and an expected value for the phase leg current that is less than the threshold value indicates the phase leg current sensors 114, 116, 118 are functioning properly and/or within a desired tolerance relative to the motor phase current sensors 110, 112. For example, in accordance with one embodiment, the threshold value is equal to about twenty percent of the expected peak value for the motor phase currents during operation of the electrical system 100. In this regard, the validation process 300 validates or otherwise verifies the accuracy of a measured phase leg current from a phase leg current sensor 114, 116, 118 when the difference between the measured value and the expected value for the phase leg current is less than the threshold value.

The validation process 300 begins by determining whether a nonzero value is expected for the respective measured phase leg current value being validated (task 302). In this regard, as described above, the control module 108 determines that a respective measured phase leg current obtained from a respective phase leg current sensor 114, 116, 118 is expected to be equal to zero when its associated switch 132, 136, 140 is opened (or turned off) or its corresponding motor phase current is in the positive direction (e.g., flowing through a respective phase leg 142, 144, 146 from node 154 to node 128). Alternatively, the control module 108 determines that a respective measured phase leg current obtained from a respective phase leg current sensor 114, 116, 118 is expected to be equal its corresponding measured motor phase current when its associated switch 132, 136, 140 is closed (or turned on) or its corresponding motor phase current is in the negative direction (e.g., flowing through a respective phase leg 142, 144, 146 from node 128 to node 154).

In response to determining the respective measured phase leg current value being validated is not expected to be equal to zero, the validation process 300 continues by comparing the respective measured phase leg current value to its corresponding measured motor phase current and determining whether the difference between the measured phase leg current and the measured motor phase current exceeds a first threshold value indicative of an error condition (task 304). In response to determining the difference between the measured phase leg current value and its corresponding measured motor phase current value is less than the first threshold value, the measured phase leg current and measured motor phase current values are verified or otherwise validated, and the validation process 300 exits or repeats for another measured phase leg current value.

In response to determining the difference between a measured phase leg current and its corresponding measured motor phase current exceeds the first threshold value, the validation process 300 identifies an error condition and initiates a remedial action (task 306). For example, in accordance with one embodiment, the control module 108 may disable the current-controlled operation of the electric motor and provide appropriate PWM command signals to safely bring the electric motor 106 to a stop. In other embodiments, the control module 108 may control the voltage and/or current provided to the electric motor 106 in a manner that causes the torque produced by the electric motor 106 to roughly track the torque command without reliance on current sensors 110, 112. In some embodiments, the control module 108 may limit the voltage and/or current provided to the electric motor 106. In addition, the control module 108 may be configured to take additional remedial measures, such as, for example, providing notification of a current sensor error to an ECU or another supervisory control system or component of the electrical system 100 which causes an audible and/or visual warning to be generated in the vehicle 160 (e.g., turning on the check engine light). It should be appreciated that any number of remedial actions and various combinations thereof may be utilized in any practical embodiment.

It should be noted that in some embodiments, the control module 108 may be configured to wait to ensure the error condition persists for at least a predetermined amount of time or is otherwise identified a predetermined number of times prior to initiating remedial action. For example, in response to initially identifying the error condition when validating a respective measured phase leg current value, the control module 108 may initiate a timer or another suitable timing mechanism and thereafter initiate additional remedial action(s) (e.g., stopping the motor 106, limiting voltage and/or current to the motor 106, and/or providing notification to a higher level system) only in response to identifying that an error condition for that respective phase of the motor 106 persists for an amount of time greater than a predetermined threshold amount of time established by the timing mechanism. For example, in some embodiments, in response to identifying an initial error condition when validating a measured phase leg current value for a respective phase of the motor 106, the control module 108 may wait for a predetermined amount of time (e.g., 200 milliseconds) and then initiate additional remedial action(s) in response to identifying the presence of the error condition when executing the validation process 300 to validate a subsequent measured phase leg current value for that respective phase of the motor 106 that was obtained after the predetermined amount of time. In other embodiments, in response to initially identifying the error condition when validating a respective measured phase leg current value, the control module 108 may initiate a counter and only initiate additional remedial action(s) when a predetermined number of error conditions are identified. In this regard, for a respective measured phase leg current, the control module 108 may have the opportunity to perform the validation process 300 on a number of measured values for that respective measured phase leg current within a predetermined amount of time. For example, within a period of 200 milliseconds, the control module 108 may perform the validation process 300 on the measured phase A leg current 30 or more times, wherein the control module 108 may initiate remedial actions only after identifying an error condition more than a threshold amount of times within the 200 millisecond interval (e.g., more than 10 times) or more than fifty percent of the time during the 200 millisecond interval (e.g., if the control module 108 performs the validation process 300 30 times on the measured phase A leg current over a 200 millisecond interval, the control module 108 initiates remedial action after identifying an error condition at least 15 times within the 200 millisecond interval).

Still referring to FIG. 3, in response to determining the respective measured phase leg current value being validated is expected to be equal to zero, the validation process 300 determines whether the magnitude of the measured phase leg current exceeds a second threshold value indicative of an error condition (task 308). In response to determining the magnitude of the measured phase leg current is less than the second threshold value, the measured phase leg current value is verified or otherwise validated, and the validation process 300 exits or repeats for another measured phase leg current value. In response to determining the magnitude of the measured phase leg current value exceeds the second threshold value when the measured phase leg current value is expected to be equal to zero, the validation process 300 identifies an error condition and initiates a remedial action (task 306), as described above. As described above, in accordance with one or more embodiments, in response to initially identifying the error condition when a measured phase leg current value is expected to be equal to zero, the control module 108 may initiate a timer, a counter, or another suitable timing mechanism and thereafter initiating additional remedial action(s) (e.g., stopping the motor 106, limiting voltage and/or current to the motor 106, and/or providing notification to a higher level system) only in response to identifying that an error condition for that respective phase of the motor 106 persists for an amount of time greater than a predetermined threshold amount of time established by the timing mechanism or occurs a predetermined number of times within the predetermined threshold amount of time.

In an exemplary embodiment, the validation process 300 is performed for each measured phase leg current value obtained during a given PWM interval to ensure fault-free operation of the electrical system 100 and that the current sensors 110, 112, 114, 116, 118 are functioning properly. For example, referring to FIG. 3 and with reference to FIG. 1, for a measured phase A leg current value obtained from the phase A leg current sensor 114, the control module 108 determines whether or not the expected value for the phase A leg current sensor is equal to zero (task 302). In this regard, if the measured phase A leg current value was obtained while the switch 132 was closed and the measured phase A current obtained from the phase A current sensor 110 is negative, the control module 108 determines that the expected value for the measured phase A leg current value is equal to or otherwise corresponds to the phase A motor current, and in response, compares the measured phase A leg current value obtained from the phase A leg current sensor 114 to the measured phase A current value obtained from the phase A current sensor 110 (task 304). When the difference between the measured phase A leg current value obtained from the phase A leg current sensor 114 and the measured phase A current value obtained from the phase A current sensor 110 is less than the threshold value, the control module 108 validates or otherwise verifies the phase A current sensors 110, 114 are functioning properly and the measured current values from the phase A current sensors 110, 114 are sufficiently accurate. However, when the difference between the measured phase A leg current value obtained from the phase A leg current sensor 114 and the measured phase A current value obtained from the phase A current sensor 110 exceeds the threshold value, the control module 108 identifies an error condition and initiates one or more remedial actions (task 306), as described above. Conversely, when the measured phase A leg current value was obtained while the switch 132 was opened or the measured phase A current obtained from the phase A current sensor 110 is positive, the control module 108 determines that the expected value for the measured phase A leg current value is equal to zero (task 302), and in response, compares the magnitude of the measured phase A leg current value obtained from the phase A leg current sensor 114 to a second threshold value (task 308). When the magnitude of the measured phase A leg current value obtained from the phase A leg current sensor 114 is less than the second threshold value, the control module 108 validates or otherwise verifies the phase A leg current sensor 114 is functioning properly. However, when the magnitude of the measured phase A leg current value obtained from the phase A leg current sensor 114 exceeds the second threshold value, the control module 108 identifies an error condition and initiates one or more remedial actions (task 306). The control module 108 may then repeat the validation process 300 for the measured phase B leg current value(s) and measured phase C leg current value(s) obtained from the remaining phase leg current sensors 116, 118 during the PWM interval.

One advantage of the systems and/or methods described above is that only two relatively high-accuracy motor phase current sensors are used to provide current-based control of the electric motor while phase leg current sensors are used to verify and/or validate the accuracy of the two phase current sensors and detect other fault conditions in the electrical system. As a result, unintended motor torque may be prevented or otherwise detected reasonably quickly (e.g., within a PWM cycle or within a predetermined time limit). Additionally, the erroneous phase current sensor may be identified. For example, if the difference between measured values and expected values is greater than the threshold value for the phase A current but is less than the threshold value for the phase B current and the phase C current, it may be determined that the phase A current sensor (e.g., current sensor 110) is not functioning properly.

For the sake of brevity, conventional techniques related to electrical energy and/or power conversion, power inverters, pulse-width modulation, current sensing and/or sampling, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used herein for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle comprising:
   a direct current, DC, interface;
   an electric motor having a plurality of phases;
   an inverter module coupled between the DC interface and the electric motor, the inverter module comprising a plurality of phase legs, wherein each phase leg corresponds to a respective phase of the electric motor;
   a first current sensor between a first phase leg of the plurality of phase legs of the inverter module and a first phase of the electric motor to measure a first current flowing through the first phase of the electric motor;
   a second current sensor between the first phase leg and the DC interface to measure a second current flowing through the first phase leg; and
   a control module coupled to the first current sensor and the second current sensor, wherein the control module is configured to initiate remedial action based at least in part on a difference between the first current measured by the first current sensor and the second current measured by the second current sensor.

2. The electrical system of claim 1, wherein the control module is configured to:
   determine when the second current is expected to be equal to the first current; and
   initiate remedial action based on the difference between the first current measured by the first current sensor and the second current measured by the second current sensor only when the second current is expected to be equal to the first current.

3. The electrical system of claim 2, the control module being coupled to the inverter module, wherein the control module is configured to:
   generate command signals to operate the plurality of phase legs of the inverter module for a switching interval;
   determine, based on the command signals, whether the second current is expected to be equal to zero or the second current is expected to be equal to the first current based on the command signals; and
   initiate remedial action based on the difference between the first current measured by the first current sensor and the second current measured by the second current sensor when the second current is expected to be equal to the first current; and
   initiate remedial action when a magnitude of the second current is greater than a second threshold value when the second current is expected to be equal to zero.

4. The electrical system of claim 3, wherein the control module generates the command signals in a manner that is influenced by a second difference between the first current measured by the first current sensor and a current command for the first phase of the electric motor.

5. The electrical system of claim 1, further comprising:
a third current sensor between a second phase leg of the plurality of phase legs of the inverter module and a second phase of the electric motor to measure a third current flowing through the second phase of the electric motor; and
a fourth current sensor between the second phase leg and the DC interface to measure a fourth current flowing through the second phase leg, wherein the control module is coupled to the third current sensor and the fourth current sensor, wherein the control module is configured to initiate remedial action based on a difference between the third current measured by the third current sensor and the fourth current measured by the fourth current sensor when the fourth current is expected to be equal to the third current.

6. The electrical system of claim 1, wherein:
the first phase leg includes a first switching element on a semiconductor substrate, the second current flowing through the first switching element; and
the second current sensor is integrated on the semiconductor substrate and configured to measure the second current.

7. The electrical system of claim 6, wherein the first current sensor is a Hall effect current sensor.

8. The electrical system of claim 5, further comprising a fifth current sensor between a third phase leg of the plurality of phase legs of the inverter module and the DC interface to measure a fifth current flowing through the third phase leg, the third phase leg corresponding to a third phase of the electric motor, wherein the control module is coupled to the fifth current sensor and configured to:
calculate a sixth current flowing through the third phase of the electric motor based on the first current measured by the first current sensor and the third current measured by the third current sensor; and
initiate remedial action based on a difference between the fifth current measured by the fifth current sensor and the sixth current when the fifth current is expected to be equal to the sixth current flowing through the third phase of the electric motor.

9. The electrical system of claim 1, wherein the control module is configured to initiate remedial action based on a magnitude of the second current when the second current is expected to be equal to zero.

10. The electrical system of claim 1, wherein the control module initiates remedial action when the difference between the first current measured by the first current sensor and the second current measured by the second current sensor persists for an amount of time greater than a predetermined threshold amount of time.

11. A method for operating an electrical system including an inverter coupled to an electric motor, the method comprising:
obtaining a first phase current flowing through a first phase of the electric motor;
measuring a first current flowing through a first phase leg of the inverter using a first current sensor, the first phase leg being coupled to the first phase of the electric motor;
determining an expected value for the first current; and
when the expected value corresponds to the first phase current, initiating remedial action based on a difference between the first phase current and the measured first current.

12. The method of claim 11, further comprising initiating remedial action based on a magnitude of the measured first current when the expected value corresponds to zero.

13. The method of claim 11, wherein obtaining the first phase current comprises measuring the first phase current flowing through the first phase of the electric motor using a second current sensor.

14. The method of claim 11, wherein obtaining the first phase current comprises:
measuring a second phase current flowing through a second phase of the electric motor using a second current sensor;
measuring a third phase current flowing through a third phase of the electric motor using a third current sensor; and
calculating the first phase current based on the measured second phase current and the measured third phase current.

15. The method of claim 14, further comprising:
measuring a second current flowing through a second phase leg of the inverter using a fourth current sensor, the second phase leg being coupled to the second phase of the electric motor;
determining a second expected value for the second current; and
initiating remedial action based on a difference between the measured second phase current and the measured second current when the second expected value corresponds to the second phase current.

16. The method of claim 15, further comprising:
measuring a third current flowing through a third phase leg of the inverter using a fifth current sensor, the third phase leg being coupled to the third phase of the electric motor;
determining a third expected value for the third current; and
initiating remedial action based on a difference between the measured third phase current and the measured third when the third expected value corresponds to the third phase current.

17. The method of claim 11, wherein determining the expected value comprises determining the expected value for the first current based on a voltage vector applied to the electric motor by the inverter during a switching interval, the first current being measured during the switching interval.

18. The method of claim 11, further comprising:
obtaining a second phase current flowing through a second phase of the electric motor;
measuring a second current flowing through a second phase leg of the inverter using a second current sensor, the second phase leg being coupled to the second phase of the electric motor;
determining a second expected value for the second current; and
initiating remedial action based on a difference between the measured second phase current and the measured second current when the second expected value corresponds to the second phase current.

19. An electrical system comprising:
an electric motor having a first phase;
an inverter module coupled to the electric motor, the inverter module including a first phase leg;
a first current sensor configured to measure a first current flowing through the first phase leg of the inverter module, the first phase leg being coupled to the first phase of the electric motor; and a control module coupled to the first current sensor and the inverter module, wherein the control module is configured to:
obtain a first phase current flowing through the first phase of the electric motor; and
initiate remedial action when a difference between the first current and the first phase current is indicative of an error condition.

20. The electrical system of claim 19, further comprising:
a second current sensor between the inverter module and the first phase of the electric motor to measure the first phase current flowing through the first phase of the electric motor;
a third current sensor between the inverter module and a second phase of the electric motor to measure a second phase current flowing through the second phase of the electric motor;
a fourth current sensor configured to measure a second current flowing through a second phase leg of the inverter module, the second phase leg being coupled to the second phase of the electric motor; and
a fifth current sensor configured to measure a third current flowing through a third phase leg of the inverter module, the third phase leg being coupled to a third phase of the electric motor, wherein:
the control module is coupled to the second current sensor, the third current sensor, the fourth current sensor, and the fifth current sensor; and
the control module is configured to:
obtain the first phase current from the second current sensor;
initiate remedial action when a difference between the second current and the second phase current is indicative of the error condition;
calculate a third phase current based on the first phase current and the second phase current; and
initiate remedial action when a difference between the third current and the third phase current is indicative of the error condition.

* * * * *